METHOD OF MOLDING BONDED PARTS WITH SILICON CARBIDE SURFACES

This invention concerns a method for bonding together molded parts, composed of silicon carbide at least at and adjacent to the surfaces to be joined, by applying a cokable binder on those surfaces followed by coking the binder and heating of at least the joints in the presence of silicon.

Silicon carbide molded bodies of complicated shape are in practice made of several parts which have to be joined together.

Thus, in U.S. Pat. No. 2,319,323 a method is described according to which parts of carbon or silicon carbide or of a reaction-bonded silicon carbide (designated as "SiSiC", which is a material containing an excess of silicon) are joined together with an adhesive made of carbon and cokable binder and are then heated in the presence of silicon powder at temperatures above about 1800° C.

According to another method, described in German patent document DE-AS 17 96 279, molded bodies having a silicon carbide coating and a carbon core are made of carbon parts which are joined by a cement made of cokable binder, carbon, and silicon carbide and are heated briefly to the range of 1650° to 2200° C. in the presence of an excess of molten silicon.

In a pending U.S. Patent Application Ser. No. 423,458, filed Sept. 24, 1982 and now issued as U.S. Pat. No. 4,487,644 to the assignee of the present application, a method is described in which at least one of the joined surfaces of parts made of silicon carbide, or having a silicon carbide surface layer, is made to contain an excess of silicon in the form of SiSiC. The finely polished joint surfaces are joined together in that method without any adhesion and are heated, preferably under the application of a certain pressing force of at least 0.1 kg/cm² on the joined surfaces, up to 1500° to 1800° C. for 15 to 100 minutes, in an inert atmosphere at a pressure between $10^{-3}$ torr to 1 atmosphere.

Whereas in the methods working with an adhesive, difficulties occur relative to the shape fidelity of the products of the process, in the case of the methods working without adhesive, there is a degree of uncertainty regarding the joining together without defects of the surfaces to be welded together, and, in addition, in the processess working with an applied pressure, there is a complication by the need of pressure application.

SUMMARY OF THE INVENTION

The object of the present invention is to provide a process for joining silicon carbide molded parts which will operate as simply as possible and with few rejects.

Briefly, the surfaces to be joined are at first roughened either by removing the free silicon up to a depth of not less than 100 μm from the surface layer of reaction bonded silicon carbide containing at least 15% free silicon or else with laser shots producing pits distributed over the surfaces. Then the pores of the thus treated surfaces are impregnated with a cokable binder followed by coking of the binder, the steps of applying a binder and coking it being preferably repeated two to four times, after which the parts are put together and finally heated in the presence of silicon to convert said carbon in the pores to silicon carbide at temperatures between 1500° and 2000° C., the silicon being supplied either by bringing molten silicon to the edges of the joint, or by attaching a silicon releasing powder packing to the edges of the joint. Alternatively a thin wafer of synthetic resin containing silicon dispersed therein is interposed between the joined roughened surfaces which are finally heated. In the course of this heating said resin of the wafer is soaked into the pores wherein it is coked and finally converted into silicon carbide by reaction with the silicon component of the wafer.

This final heating step brings at least the joint to a temperature between 1500° and 2000° C., and preferably between 1600° and 1800° C., and converts the carbon in the joint zone to silicon carbide.

The separation of free silicon up to a depth of at least 100 μm can be achieved by evaporating or leaching the superfluous silicon out of the surface layer.

The process of the invention makes it unnecessary to utilize a vacuum system. Devices for pressing the parts together are not necessary either. A trouble-free bonding of the parts is obtained, as has been shown to be the case by microphotography of ground samples exposing the joint in cross section. In such microphotographs, the seam corresponding to the joint is no longer visible. The great advantage of the process of the invention, which can be carried out without vacuum systems or pressing devices, is that even at inaccessible locations and at the bottom of cavities it is possible to weld parts together directly in any site (in situ).

Reaction-bonded silicon carbide contains free silicon that fills the open pores of the material. In the process of the invention the free silicon is driven out of the surfaces to be joined, especially by means of an etching treatment, thus producing a "roughened" surface containing anchoring pits that are then loaded with finely divided carbon as the result of repeated treatment with cokable material followed by coking. For the cokable materials, there come into consideration, as a whole, the known resins, tars, pitches, and the like. The finely divided carbon reacts upon further heating quite rapidly with the silicon that infiltrates when it is applied to the joint after the surfaces to be joined are put together.

This process can be simplified by applying a synthetic resin foil of a thickness up to about 1 mm containing fine silicon powder (especially from 10 to 50 mg per cm², grain size not exceeding 1 μm, pretreated with hydrofluoric acid) either on or inbetween the joined surfaces. Upon heating the joint, the resin first passes through a thin liquid phase during which it infiltrates into the pores and then it is converted into carbon at higher temperatures. Upon further heating, up to at least 1600° C., the silicon located in the joint, and the carbon together produce silicon carbide. Preferably said foil or wafer has a thickness of 10 to 100 μm and contains 30 to 70 wt. % silicon powder. Most preferred are wafers of 20 to 50 μm containing about 50 wt. % silicon.

For removal of the free silicon from the SiSiC surface, a treatment with a solution of HF and $HNO_3$ or with potassium or sodium hydroxide, for example, is suitable. The acid or alkaline treatment lasts for several hours at temperatures between 20° and 80° C. The treatment temperature and the concentration of the solution are two variables which determine the removal of the free silicon. High temperatures and high concentrations provide for rapid de-siliconizing. At lower temperatures and concentrations, the process runs only slowly.

As a rule, after four to six hours of etching at temperatures in the range from 70° to 80° C., with a concentration of the acid or alkaline solution of about 40%, a desiliconized zone of from 400 to 600 μm in depth is

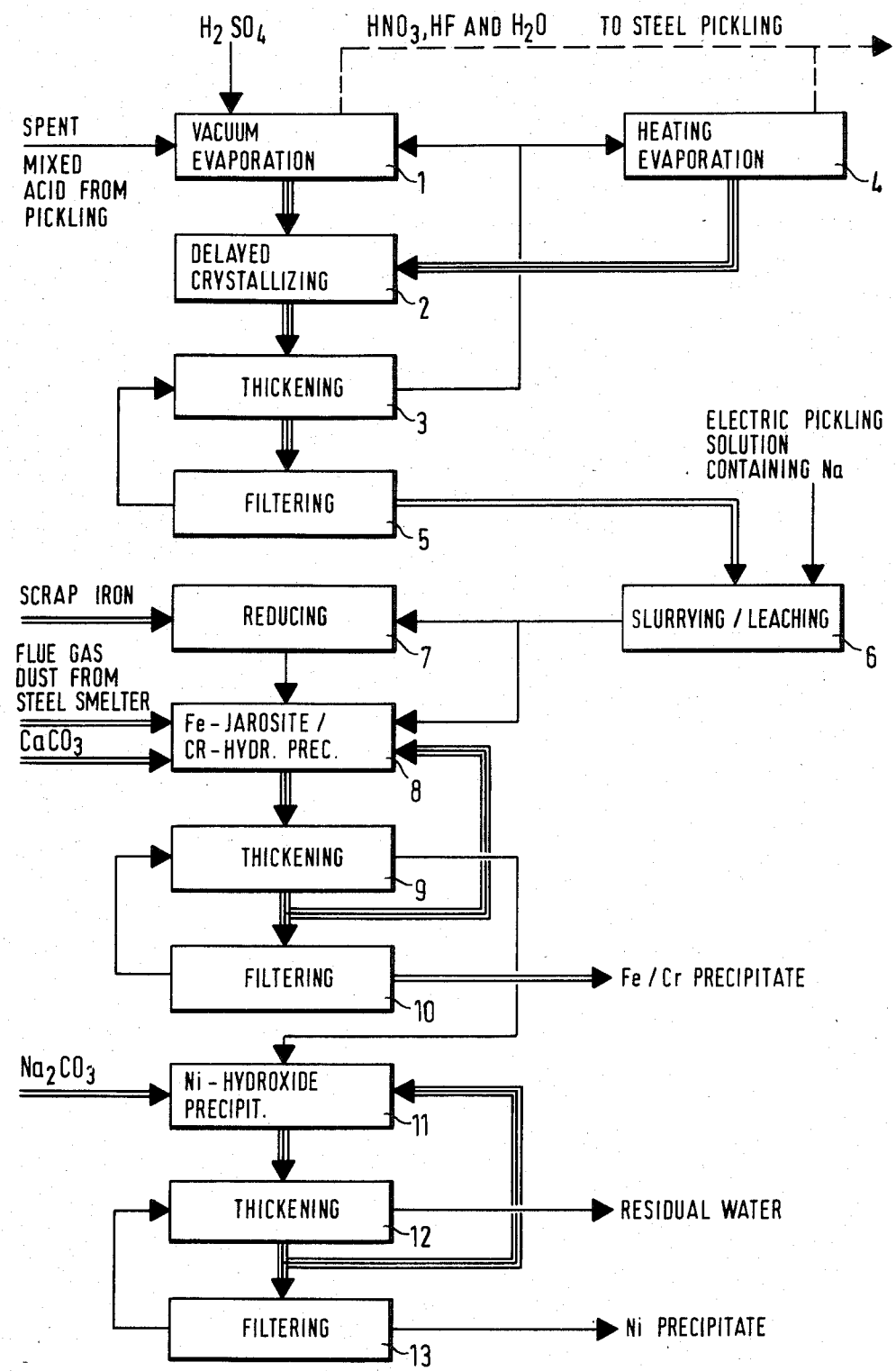

METHOD FOR REGENERATING PICKLING ACIDS

The present invention concerns a method wherein hydrofluoric acid and nitric acid used specifically in steel pickling are regenerated by mixing them in sulphuric acid, whereby heating of the mixture and concentrating it with regard to sulphuric acid causes the hydrofluoric and nitric acids to distil into the vapor phase, while the metals that have been dissolved in the pickling acids remain in the sulphur acid. By condensating the distillates, the hydrofluoric acid and the nitric acid may be reused in the pickling process. The metal sulphate salt produced at evaporation is converted to be scarcely soluble iron jarosite and chrome and nickel hydroxide, the latter metal hydroxide being obtained as a separate, utilizable precipitate.

When the internal structure of stainless and acid-resistant steel has to be homogenized, the steel material is subjected to heat treatment. In conjunction with the heat treatment, which takes place in an atmosphere containing oxygen, scarcely soluble spinel-like metal oxides are produced. Under the oxide layer, in the surface layer of the steel mass, a low-chrome zone is formed.

The oxide layer and the low-chrome zone are removed by pickling. The greater part of the oxide layer is removed by electrolytic pickling in a neutral $Na_2SO_4$ solution. Chromate is dissolved in the solution at this stage. The rest of the oxide and the low-chrome zone are removed by mixed acid pickling ($HNO_3+HF$). By this treatment, the steel surface becomes passivated and acquires its characteristic colour. The mixed acid usually contains 1-3% HF and 10-15% $HNO_3$. In the pickling process the composition of the mixed acid is altered and its pickling capacity decreases. The free acid content goes down, while the metal content increases. The nitric acid decomposes into nitrogen oxides and oxidizes the metals to divalent and trivalent ions. The fluoride forms complexes with chromium and iron ions.

To maintain a constant pickling effect is only possible to a limited degree by raising the temperature and the acid content. When the iron content surpasses 50 g/l, the pickling acid has to be changed.

Methods are known in the art in which the pickling acid is neutralized with lime; the metal hydroxides thereby precipitated and the scarcely soluble $CaF_2$ go to waste. The nitrates remain mainly in the filtrate and cause environmental problems.

In the U.S. Pat. Nos. 2,993,757, 3,840,646 and 4,255,407 are known methods wherein sulphuric acid has been mixed to the pickling acid, whereby the hydrofluoric and nitric acids, being weaker acids, can be distilled off. The distillation is advantageously carried out under reduced pressure. At the same time, the metals contained in the pickling acid form sulphates with the sulphuric acid, which precipitate as the sulphuric acid is being concentrated, whereafter they are filtered. However, these methods have the drawback that the crystallizing conditions of said metals are not controlled. When the metal contents have reached a given level, the crystallizing is impaired and the mother solution undergoes a "syrupy transformation", and the separation of metals by filtering methods becomes increasingly difficult. Therefore also the spent sulphuric acid could not be efficiently recirculated. Dumping or neutralizing all sulphuric acid is inconceivable out of economic and environment considerations. On the other hand, even those instances in which metal sulphates could be produced and separated from the sulphuric acid have not solved the waste problem, since the filtered sulphate precipitate contains soluble and toxic metals, and free sulphuric acid in abundance. Owing to its high sulphuric acid content, the precipitate is very difficult to feed as such into other metallurgical processes.

The method of the invention enables pickling acids to be treated with sulphuric acid in such a way that the crystallizing of metal sulphates is carried out in continuous, controlled operation, whereby the metal sulphates can be separated from the sulphuric acid. The method of the invention includes moreover the considerable improvement that the metal sulphate precipitate is converted into insoluble form, whereby it can be stored as a waste product and at the same time the nickel present as a valuble component can be separated from the metal precipitate.

By the method of the present invention, endeavours have been made to eliminate the above-mentioned drawbacks encumbering prior art.

The invention is described in greater detail in the following, reference being made to the drawing, which presents the flow sheet of the method.

The spent pickling acid, or the mixed acid, which usually contains $HNO_3$ about 100 g/l, HF about 30 g/l and iron 30-50 g/l, chrome 6-10 g/l, nickel 6-10 g/l and lesser quantities of other metals used in steel production, is fed into a forced cycling vacuum evaporator 1 together with $H_2SO_4$ returned from the separation 3 and 5 of sulphate precipitates. In the evaporator 1, the mixture is heated to about 80° C. by circulating the solution with the aid of a pump through heat exchangers so that the sulphuric acid concentration will be about 60%. The sulphuric acid sets free the fluorides and nitrates bound to metals in the form of acids, and these together with the free hydrofluoric and nitric acid are distilled, and they are condensed in a heat exchanger. The distillation is preferably effected under sub-atmospheric pressure, which is maintained by a vacuum pump.

Our research into the causes responsible for the metal sulphates' poor crystallization revealed that, initially, crystallization proceeded favourably and the crystals were easy to filter, but when the process was run continuously, crystallization deteriorated and the crystal mixture became syrupy, rendering the separation of crystals from sulphuric acid by filtration impossible. The unexpected observation was made that chrome, and even more notably nickel, was hardly precipitated at all; instead, they formed chain-like sulphate complexes, which even interfered with the precipitation of iron. Disintegration of these complexes is a prerequisite for successful crystallization and filtration. It was now found that raising of the temperature and of the sulphuric acid concentration will decompose said complexes, as a consequence of which chrome and nickel are precipitated. The temperature is held at 120°-250° C., preferably at 150°-220° C., and the sulphuric acid concentration at 70-85%. The lower the temperature and the $H_2SO_4$ concentration, the longer is the retention time prerequisite for precipitation. It was further noted that iron is satisfactorily crystallized at 60% sulphuric acid concentration when the chrome content is kept lower than 15 g/l in the mother solution. In this way, the crystallizing event can be kept under control if so much mother solution is removed to heating that the chrome content is maintained within the allowable limits. It was also found that the chrome precipitation with about 24 hrs retention time is roughly half of the quantity introduced, also from 60% sulphuric acid. Utilization of this fact reduces further the solution feed to the heating that is required. It is advantageous to try to reduce the heating feed, because the heating must take place in reactors constructed of expensive material, and it is hereby possible to make them smaller.

The mixture that is obtained from the vacuum evaporator 1 contains only small residues of HF and $HNO_3$, i.e., 0.2–0.3% when the sulphuric acid content is about 60%. This mixture also contains all the metals. The mixture is conducted to the crystallizing stage 2, where enough retention time is provided to achieve that 70–90% of the iron, 20–60% of the chrome are crystallized, while the nickel mainly remains in the mother solution. From the crystallizer, the slurry is pumped to the thickener 3, wherefrom the main part of the overflow is carried back to the forced circulation evaporator 1.

In order to regulate the chrome level in the evaporator/delayed crystallization circuit, part of the overflow from the thickener is taken to be heated for disintegration of the chrome-nickel complexes in the heating evaporation stage 4. Disintegration of the Cr-Ni complexes is advantageously accomplished in a so-called immersion evaporator, where combustion gases produced in a combustion chamber are conducted directly into the solution. In this apparatus about 80% sulphuric acid concentration is achieved at about 170°–180° C., owing to the fact that the combustion gases act as carrier gases. The exhaust gases are advantageously condensed in a venturi scrubber, whereafter the acid droplets are separated in an acid mist separator. In this manner are also recovered the residual hydrofluoric and nitric acids from the evaporation/crystallizing stages in the 60% sulphuric acid, which are released at the heating step into the exhaust gases. Heating can also be accomplished e.g. by electricity by fitting a.c. resistances either directly in the solution or by heating the reactor. In this case, however, the operating temperature will be higher, about 210°–230° C.

The process may of course also be run so that the vacuum evaporation and crystallizing stage is by-passed, the spent pickling acid being supplied together with sulphuric acid directly to the heating evaporation, the sulphate sludge therefrom obtained being conducted to the thickener, and the underflow from this to filtration, while the overflow together with the filtrate is cycled back to the heating evaporation. This simplification would, however, cause considerable increase of apparatus bulk in the heating stage. Presently, the heating stage has to be constructed of expensive plastic materials, which are potentially susceptible to damage owing to errors in running the process. It is therefore advantageous to make the heating stage as small as possible.

The sulphate sludge produced by the heating evaporator 4 operating in the side line, largely containing crystallized chrome and nickel sulphate, is conducted to a delay crystallizer 2, where it is combined with the slurry containing mainly crystallized iron sulphate. It is possible by this method to avoid separate filtering of the sludge produced by the heating evaporator, this being enabled by the observation that chrome and nickel sulphate that has crystallized in 80% sulphuric acid is not redissolved in 60% sulphuric acid, although said metal sulphates in dissolved form may occur as chain-resembling mixed complexes in the last-mentioned acid environment.

The underflow from the thickening 3 subsequent to the delayed crystallization stage 2 is conducted to filtration 5, the filtrate obtained therefrom being returned to thickening 3. In the evaporation circuit make-up sulphuric acid is added, its quantity stoichiometrically equivalent to the metals present is the spent pickling acid and to the residual sulphuric acid in the sulphate precipitate produced at the filtering stage 5.

The precipitate obtained at the filtration stage 5 is transferred to a slurrying/leaching stage 6, to which is advantageously conducted neutral solution containing sodium sulphate, from electrical pickling. A minor part of the solution produced at the stage 6 is conducted to a reduction stage 7, where iron(III) is reduced to iron(II) by adding scrap iron. The greater part of the solution from stage 6 is carried directly to a jarosite precipitation stage 8, where the iron is precipitated mainly in the form of jarosite $Na[Fe_3(SO_4)_2(OH)_6]$ at the temperature of 80°–100° C. and at pH 1.0–2.0. In order to reach this pH range, sulphuric acid-neutralizing alkali is added, which advantageously is ground limestone and/or flue gas dust from a steel smelter. This dust is solid material separated from the flue gases of the arc furnace and AOD converter by means of hose filters, originating from slag, flux (e.g. lime) and rust dust, scale or other impurities present in the scrap. The chrome(VI) contained in the latter and the chrome(VI) present in the neutral electric pickling solution are reduced to the form of chrome(III) less detrimental to the environment, at the jarosite precipitation stage 8, by conducting to this stage iron(II) solution prepared from the reduction stage 7.

It is possible by using flue gas dust to reduce the lime stone requirement in the jarosite precipitation stage while at the same time the toxic component chrome(VI) of said dust will be annihilated. Thanks to the potassium present in the flue gases, the iron may also be precipitated as potassium jarosite.

Electric pickling solution also contributes to reducing the need for neutralizing, since thanks to the sodium contained in said solution the iron can be precipitated in the jarosite form, which consumes less alkali. Of the other metals, chrome is precipitated in the jarosite precipitation 8 as hydroxide $Cr(OH)_3$, while nickel remains unprecipitated in the solution. Raising the pH value into the range of 2.0–4.5 concludes the jarosite precipitation stage 8, for precipitating the ultimate iron and chrome quantities. The sludge produced at the jarosite precipitation stage 8 is carried to a thickening stage 9 and, on precipitation, to a filtering stage 10, where the filtered precipitate is also washed.

The filtrate and the washing solution are returned to the thickening stage 9, wherefrom part of the thickened underflow is also carried to the jarosite precipitation 8. The overflow of the thickening stage 9 is in turn carried to the separation stage 11 of the value metal nickel, where the nickel is precipitated advantageously as hydroxide at the temperature 80°–100° C. and at pH 8.0–10.0. For the raising of pH necessary for nickel precipitation, sodium carbonate is advantageously used as alkali. The sludge formed in the nickel precipitation stage 11 is carried to a thickening stage 12, wherefrom part of the underflow is returned to the precipitation stage 11 and part of the underflow is conducted to the filtering stage 13 for recovering the nickel hydroxide. The filtrate obtained at the stage 13 is returned to the thickening stage 12, of which the metal-free overflow may be conducted out from the process as harmless residual water.

metal contents and crystal quantity that took place during different crystallization periods. During the crystallization period No. 32, the strongly accelerated crystallization reduced considerably the degree of supersaturation of said solution, resulting in a sulphate sludge difficult to filter and which settled unsatisfactorily.

TABLE belonging to Example 2

| | Length of crystall. period, hrs | Crystal quantity (wet) g/l | composition $H_2SO_4$ | Fe % | Cr % | Ni % | Liquid composition Fe g/l | Cr g/l | Ni g/l |
|---|---|---|---|---|---|---|---|---|---|
| Feed solution in cryst. periods 1-15 | | | | | | | 8.00 | 1.75 | 1.49 |
| 1. crystallizing period | 24.0 | 43.9 | 34.4 | 10.0 | 0.20 | 0.09 | 3.8 | 2.0 | 1.8 |
| 2. crystallizing period | 25.5 | 28.5 | 23.2 | 14.3 | 0.30 | 0.06 | 6.0 | 3.0 | 2.6 |
| 3. crystallizing period | 25.0 | 30.1 | 25.4 | 13.5 | 0.40 | 0.08 | 8.0 | 4.0 | 3.6 |
| 4. crystallizing period | 89.0 | 73.4 | 36.8 | 9.6 | 0.80 | 0.20 | 8.0 | 4.8 | 4.6 |
| 5. crystallizing period | 24.5 | 64.5 | 29.0 | 10.2 | 0.94 | 0.15 | 8.4 | 5.4 | 5.8 |
| 6. crystallizing period | 24.5 | 58.3 | 29.0 | 10.1 | 0.89 | 0.17 | 8.6 | 5.8 | 6.4 |
| 7. crystallizing period | 24.5 | 41.7 | 28.0 | 11.6 | 0.99 | 0.17 | 11.2 | 6.8 | 7.2 |
| 8. crystallizing period | 25.0 | 93.2 | 40.0 | 7.1 | 0.86 | 0.32 | 11.2 | 8.0 | 8.2 |
| 9. crystallizing period | 73.0 | 88.8 | 32.0 | 8.2 | 0.99 | 0.30 | 10.2 | 8.0 | 8.6 |
| 10. crystallizing period | 20.0 | 61.4 | 37.0 | 7.7 | 0.98 | 0.35 | 12.0 | 8.8 | 9.2 |
| 11. crystallizing period | 33.0 | 91.3 | 31.0 | 8.8 | 1.00 | 0.33 | 12.0 | 8.6 | 10.0 |
| 12. crystallizing period | 23.5 | 47.4 | 31.0 | 9.7 | 1.10 | 0.31 | 14.2 | 9.4 | 10.8 |
| 13. crystallizing period | 24.0 | 59.2 | 30.0 | 10.4 | 1.20 | 0.30 | 14.2 | 10.2 | 11.4 |
| 14. crystallizing period | 72.0 | 116 | 39.0 | 6.9 | 0.97 | 0.49 | 12.4 | 10.0 | 11.6 |
| 15. crystallizing period | 26.0 | 66.4 | 30.0 | 8.8 | 1.20 | 0.38 | 14.0 | 11.2 | 12.6 |
| Feed solution in cryst. periods 30-35 | | | | | | | 49.3 | 10.4 | 9.0 |
| 30. crystallizing period | 24.5 | 239 | 29 | 9.3 | 1.9 | 0.74 | 11.0 | 13.0 | 25.0 |
| 31. crystallizing period | 23.5 | 261 | 30 | 8.5 | 1.8 | 0.70 | 9.8 | 16.2 | 28.0 |
| 32. crystallizing period | 88.0 | 590 | 42 | 4.6 | 1.9 | 2.0 | 1.34 | 8.2 | 19.2 |
| 33. crystallizing period | 23.0 | 570 | 43 | 4.7 | 1.6 | 1.4 | 1.24 | 6.0 | 17.4 |
| 34. crystallizing period | 25.0 | 419 | 42 | 4.8 | 1.3 | 1.89 | 2.00 | 6.0 | 16.4 |
| 35. crystallizing period | 25.0 | 405 | 42 | 5.4 | 1.3 | 0.79 | 2.58 | 7.0 | 19.6 |

EXAMPLE 1

To a series of 1.0 liters of solutions corresponding as to their contents of metals in their composition to spent pickling acid were added different quantities of $Cr_2(SO_4)_3$, thereafter raising the $H_2SO_4$ content to 60% by means of concentrated sulphuric acid. The temperature of the solutions was kept at 80° C. during a mixing period of 18 hrs, followed by the formation of crystallized sulphate salt. The table below shows at which strength the chrome addition weakens the crystallization of metal sulphates.

| Initial concentration of the solution to be crystallized | | | | Metal sulphate quantity crystallized per 1.0 l of solution g |
|---|---|---|---|---|
| $H_2SO_4$ % | Fe g/l | Ni g/l | Cr g/l | |
| 60 | 7.2 | 1.5 | 1.5 | 31.9 |
| 60 | 7.2 | 1.5 | 6.0 | 12.5 |
| 60 | 7.2 | 1.5 | 7.5 | 2.12 |
| 60 | 7.2 | 1.5 | 15 | 0 |

EXAMPLE 2

A continuous crystallizing test was carried out, in which 1.0 l/24 hrs of feed solution were evaporated. The solution was fed into a stirred crystallizing vessel, wherein the temperature was 80° C. and the $H_2SO_4$ concentration constantly 60%. The feed solution contained Fe(III), Cr(III) and Ni(II) in the same proportions as the spent pickling solution usually contains. At different times, usually once every 24 hours, ⅔ of the contents of the crystallizing vessel were filtered, continuing the uniform supply of feed solution continuously at the same rate (1.0 l/24 hrs). The test was continued for 50 days. The table below reveals the development of

EXAMPLE 3

Researching of the precipitation of Cr(III) from $H_2SO_4$ solution revealed that at normal pressure the temperature has to be raised to about 220° C. and several hours of retention time had to be provided before Cr started to precipitate in significant amount. The $H_2SO_4$ concentration was then about 80%. Since heating the solution has an obvious favourable effect on the precipitation of Cr, it was decided to examine the matter more closely in a so-called immersion heating evaporator, where combustion gases produced in a combustion chamber were directly conducted into the $H_2SO_4$ solution containing Cr and Ni.

For the researches, a container with conical bottom was constructed of special steel for heating-evaporation, having liquid capacity about 20 l. Hot combustion gases of 900°-1200° C. were produced by burning L.P. gas in a combustion chamber of about 1 l capacity. From the heating evaporator, the acid sludge was transferred to a thickener with an air lift. The underflow of the thickener was filtered at regular intervals by a suction filter. The conditions prevailing in the apparatus could be stabilized by supplying feed solution into the heating evaporator according to the surface level and removing hot solution through the thickener according to the temperature. Depending on the air coefficient used in the combustion, about 80% $H_2SO_4$ concentration was reached at temperature 165°-185° C. In the immersion heating evaporator, the boiling point of $H_2SO_4$ is lowered, the combustion gases acting as carrier gases. When the combustion gases meet the solution, a hot zone is formed here, which further promotes the precipitation of metals. When running a feed solution with $H_2SO_4$ concentration 60%, Fe 2-4 g/l, Cr 9-11 g/l and Ni 13-15 g/l in the conditions stated, 90-95% of the Fe could be precipitated, about 50% of the Cr, and about 70-80% of the Ni, with retention time 6-8 hours.

EXAMPLE 4

In continuing the crystallizing periods presented in Example 2, after the 49th crystallizing period, 50 g of the precipitate obtained in the heating evaporation as in Example 3 was added into the crystallization vessel, where a 60% sulphuric acid/metal sulphate charge 1.5 l in amount was furthermore mixed at the composition at which it had stabilized when feed solution was supplied generally at 0.5 l per 24 hrs. The composition of the wet heating evaporation precipitate was: $H_2SO_4$ 64%, Fe 1.1%, Cr 1.4%, and Ni 5.0% when the feed solution contents were: Fe 24.6 g/l, Cr 5.21 g/l, and Ni 4.44 g/l. According to the result presented in the table below (crystallizing period No. 50), the heating evaporation precipitate is not solved in these leaching conditions. In contrast, the sulphuric acid quantity contained in this precipitate decreases substantially.

TABLE belonging to Example 4

| Length of crystall. period, hrs | Crystal quantity (wet) g/l | $H_2SO_4$ | Crystal composition fe % | Cr % | Ni % | Liquid composition Fe g/l | Cr g/l | Ni g/l |
|---|---|---|---|---|---|---|---|---|
| 49. crystallizing period | 24 | 121 | 35 | 9.1 | 1.4 | 0.45 | 7.4 | 7.8 | 16.6 |
| 50. crystallizing period | 24 | 150 | 38 | 6.9 | 1.3 | 2.47 | 9.5 | 9.2 | 17.0 |

EXAMPLE 5

415 g precipitate crystallized at temperature 80° C. and 136 g $Fe(SO_4)_3$, 15.2 g $Cr_2(SO_4)_3$, 4.1 g $NiSO_4$ and 115 g $H_2SO_4$ and 262 g heating evaporation precipitate containing 24.0 g $Fe_2(SO_4)_3$, 15.2 g $Cr_2(SO_4)_3$, 7.9 g $NiSO_4$ and 144 g $H_2SO_4$ were combined and slurried in water containing $Na_2SO_4$ (Na=10 g/l), corresponding to the solution and the washing solution from the electric pickling line. 0.1 l of the solution were reduced with a 3 g dose of metallic iron, whereafter the solution was combined with the main part of the solution, 1.6 l in amount. To the combined solution, heated to 90° C., were added under mixing 400 g flue gas dust from a steel smelter, containing Fe 3.0 g, Cr 2.8 g, Ni 0.52 g, Na 2.4 g and K 7.1 g, and altogether 385 g ground limestone in the way that pH rose in 1 hr to 1.5, and in 4 hrs to 2.0, and finally after six hours for a period of two hours to 3.5. The jarosite produced was separated by filtering and washed in a 1.7 l water quantity. The washing solution and the filtrate were combined. 5.1 l of solution were obtained, which was proven to be Cr(VI)-free by analysis. The solution was further mixed at temperature 90° C., at which temperature 30 g $Na_2CO_3$ were added in order to raise pH to 9.0. Subsequent to a mixing period of 4 hrs, the precipitated nickel hydroxide was separated by filtering. The quantities and compositions of the separated Fe/Cr and Ni precipitates are presented in the following table.

| Quantity, g | Fe/Cr precipitate (wet) (Fe-jarosite) 1690 | Ni precipitate (wet) 110 |
|---|---|---|
| Fe % | 8.9 | 0.004 |
| Cr % | 2.7 | 0.005 |
| Ni % | 0.51 | 9.1 |
| Ca % | 9.1 | 0.05 |
| Na % | 0.30 | 0.50 |
| K % | 0.54 | 0.13 |

We claim:
1. A method for regenerating pickling acids containing iron, chrome and nickel, and nitric and hydrofluoric acid by admixing the pickling acid to 60% sulphuric acid and by evaporating the acids weaker than sulphuric acid and by recovering said evaporated acids from a condenser and by continuously crystalling the metal salts dissolved in the sulphuric acid in two stages and by converting said crystallized metal salts into a scarcely soluble ferro-chrome precipitate while the nickel remains in solution, comprising promoting the crystallization, by dividing the metal salt into two parts: a main line and a side line, at least part of the metal salt being crystallized in the side line and the crystals being combined with the crystallizing stage of the main line, and from the acid, soluble sulphate precipitate produced the iron being precipitated in the form of jarosite and the chrome as hydroxide.

2. A method according to claim 1, wherein mother solution to be taken into the side line is heated to the temperature 120°-150° C.

3. A method according to claim 1 or 2, wherein the sulphuric acid concentration of the side line is 70-85%.

4. A method according to claim 1 or 2 wherein an acid slurry produced in the side line is carried back to the crystallization stage in the main line.

5. A method according to claim 1 or 2 wherein evaporation-crystallization taking place in the side line is carried out in an immersion evaporator.

6. A method according to claim 1 or 2 wherein at the crystallization stage in the main line the chrome content of the mother solution is maintained below 15 g/l.

7. A method according to claim 1 or 2 wherein at the crystallization stage in the main line 70-90% of the iron contained in the mother solution and 20-60% of the chrome contained in said solution are precipitated.

8. A method according to claim 1 to 2 wherein the iron is precipitated preferably as sodium or potassium jarosite, the sodium required herefor being produced from pickling residue solutions and the potassium from flue gas dusts of a steel smelter.

9. A method according to claim 1 wherein mother solution to be taken into the side line is heated to a temperature of about 150°-200° C.

* * * * *